(No Model.)
C. W. STEVENS.
HAT POUNCING MACHINE.
No. 420,612. Patented Feb. 4, 1890.
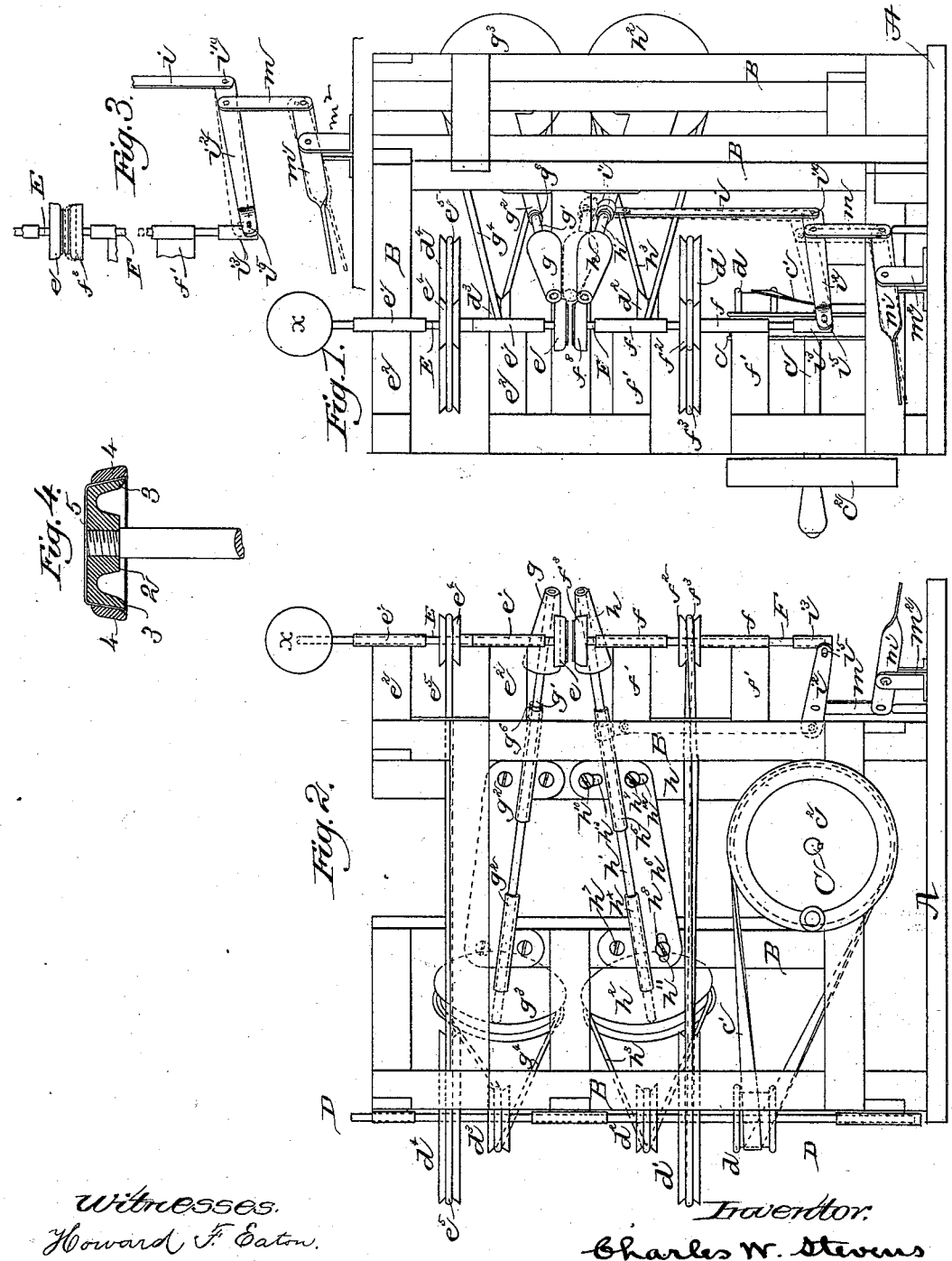
Witnesses.
Howard F. Eaton.
James H. Churchill.
Inventor.
Charles W. Stevens
by Jas. H. Lange
his attorney

UNITED STATES PATENT OFFICE.

CHARLES W. STEVENS, OF YONKERS, NEW YORK, ASSIGNOR OF ONE-HALF TO JAMES P. ROSS, OF NEWARK, NEW JERSEY.

HAT-POUNCING MACHINE.

SPECIFICATION forming part of Letters Patent No. 420,612, dated February 4, 1890.

Application filed October 31, 1888. Serial No. 289,607. (No model.)

*To all whom it may concern:*

Be it known that I, CHARLES W. STEVENS, a citizen of the United States, and a resident of Yonkers, in the county of Westchester and State of New York, have invented an Improvement in Hat-Pouncing Machines, of which the following description, in connection with the accompanying drawings, is a specification, like letters and figures on the drawings representing like parts.

Heretofore, so far as I am aware, it has been common in machines for pouncing hat-bodies and the like to employ a rotating cone or roll covered with pouncing material, which rubs the material of the hat-body in one direction, or a disk provided with pouncing material of such dimensions and arranged in such manner as to pounce the material in one direction by bringing the surface of the pouncing-disk at or near its periphery against the hat-body or material to be pounced. It is very desirable to give to the hat-body a pouncing or rubbing action as nearly akin as possible to the rotary rubbing action peculiar to hand-work, wherein the pouncing material or pouncing-block is held in the hand, and upon giving a rotary movement to the hand the long hairs in the fur of the hat-body are in the rubbing action attacked in effect from all sides to reduce, rub, or fray the same from the hat-body, and the use of machines in which the pouncing-tool rubs or drags the fur and the long hairs thereof in one direction is objectionable, for the reason that such tools draw down and pull the long hairs from the hat-body or material to be pounced, instead of rubbing, cutting, or fraying the ends of the same appearing at the surface of the hat-body, and tending, further, to pull out and carry with said long hairs portions of the fur forming the hat-body or material to be pounced, thus causing the same to be defective or thinned out in parts and rendered useless. A further effect resulting from such rubbing action in one direction has been to destroy the velvety surface so desirable in hat-bodies, and which is such a valuable feature where the rotary rubbing or pouncing has been done by hand, as in the proper pouncing of hat-bodies or other material to be pounced it is only necessary to remove by cutting, rubbing, or fraying from all sides the projecting ends of the long coarse hairs that are found in such material to produce the best results and give to the hat-body the velvety surface so desirable and sought after.

I have discovered that by the employment of a rotating tool of comparatively small diameter and dimensions, and having its pouncing-surface at or substantially at right angles to its axis of movement, and by causing said tool to bear against the material to be pounced at or near the axis of rotation thereof, I am enabled to attack, rub, or fray the long hairs of the material to be pounced from all sides, and to thereby produce results heretofore only accomplished by hand-work, without the usual loss or damage to the hat-body or material heretofore incident to machines employing tools which rub the fur and long hairs simply in one direction.

My invention consists, primarily, in a machine for treating hat-bodies or other material, in the combination, with a support for the material to be treated, of a rotating tool arranged with relation to said support to cause the operating-tool to act on the material to be treated substantially at or near the axis of rotation of said tool, and a feed device to feed the material to said pouncing-tool to be acted on thereby.

My invention consists of other and subordinate features, as hereinafter described, and particularly specified in the claims.

In the present instance I have shown the essential features of my invention as embodied in a machine for pouncing the brims of hat-bodies, preferably employing two pouncing-tools arranged opposite each other, one of which treats one side or surface of the material and the other the remaining side, the said tools being adapted to be rotated in opposite directions, and one tool acting as a support for the material in relation to the other tool, together with a pair of feeding-rolls to properly feed the material to the pouncing-tools.

Figure 1 represents in elevation, looking at the front of the machine, a machine embodying my invention, and showing in dotted lines the relative position of the treadle, its connections and lever, when actuated to raise the lower feed-roll into operative position with relation to the upper feed-roll to enable the rolls to properly feed the material to the operating-tools. Fig. 2 is a side elevation thereof to show more clearly the position and arrangement of the shaft-hanger which carries the shaft having the lower or movable feed-roll fixed thereto. Fig. 3 is a detail in elevation, showing in full lines the position of the treadle, its connections and lever, when actuated to raise the lower feed-roll into operative position with relation to the upper feed-roll to enable the rolls to feed the material to the operating-tools, and in dotted lines the position of said treadle, its connections and lever, when actuated to bring the lower operating-tool into operative position with relation to the upper operating-tool. Fig. 4 is a detail showing in central vertical section one of the operating-tools as secured to its carrying-shaft.

The base A, the frame B, the driving-shaft C, mounted in said frame, with its pulleys $c$ $c^2$, the vertically-driven shaft D, mounted in said frame, with its pulley $d$ to receive the belt $c'$ from the pulley $c$, and the pulleys $d'$, $d^2$, $d^3$, and $d^4$, mounted on said shaft D, are and may be of usual construction. In the present instance I have shown the shaft E, which carries at its lower end the upper pouncing-tool $e$, secured thereto, as loosely mounted in the bearings $e'$, to permit vertical or end play of said shaft and tool, the said bearings being attached to the arms $e^2$, secured to the frame B. The shaft E is provided with a pulley $e^4$ to receive the belt $e^5$, engaging the pulley $d^4$, whereby a rotary movement is given to said shaft E from the driven shaft D.

The purpose of loosely mounting the shaft E in its bearings and permitting vertical play is to obtain a yielding pressure of the said pouncing-tool $e$ upon the material to be treated, which is an important feature of the present invention, and to this end I contemplate the use of different weights (the one in the present instance being represented by the ball $x$, secured to the shaft E) to attain the desired pressure of the pouncing-tool $e$ on the material to be pounced. This yielding of the tool $e$ is very important in view of the inequalities in the material to be treated. The shaft F is in the present instance similarly mounted in bearings $f$, secured to the arms $f'$, attached to the frame B, and carries a pulley $f^2$, to be engaged by the belt $f^3$, running over the pulley $d'$, attached to the driven shaft D, to give a rotary movement to said shaft F, which at its upper end carries the second pouncing-tool $f^3$.

As shown in Fig. 4, each operating or pouncing tool is screw-threaded onto the end of its carrying-shaft, and is composed of a main or body portion 2, with a flange 3 and a collar or ring 4, to bind or clamp the pouncing material 5, covering the face of the body portion 2, and extending up over the surface of the flange, between said flange and ring, as shown in Fig. 4. By this construction the old pouncing material may be readily removed from the tool and new material substituted therefor.

It will be noticed that the shafts E and F are in line with each other and the pouncing-tools are arranged with their faces opposite each other. It will be observed, also, that the belt which drives the shaft F is crossed, so as to give a motion to the shaft F in a direction opposite to that of the shaft E, whereby the operating-tools are rotated in opposite directions.

The upper feed-roll $g$ is attached to the forward end of its shaft $g'$, mounted in bearings $g^2$, attached to the frame B, the said shaft having secured thereto the pulley $g^3$ to receive the belt $g^4$, running over the pulley $d^3$ on the driven shaft D to cause the feed-roll $g$ to be rotated. The pulley $g^3$ prevents endwise movement of the shaft $g'$ in its bearings in one direction, while the collar $g^6$, secured to the shaft in front of its forward bearing, prevents such movement in the opposite direction. The lower feed-roll $h$ is attached to the forward end of the shaft $h'$, similar to the shaft $g'$, and carrying the pulley $h^2$, to be engaged by the belt $h^3$, running over the pulley $d^2$ on the driven shaft D, to give a rotary movement to the lower feed-roll $h$ in a direction opposite to that of the upper feed-roll $g$, so that both feed-rolls will cause the material placed between them to be fed to the operating-tools. It will be seen from the drawings that the feed-rolls are placed in proper relation with the operating-tools for such purpose.

The shaft $h'$, which carries the lower pouncing-tool $h$, is mounted in bearings $h^5$ $h^\times$, secured to the shaft-hanger $h^6$, which in the present instance is pivoted by a screw $h^7$ to the frame B and is capable of pivotal movement on said screw $h^7$, the screws $h^8$, $h^9$, and $h^{10}$, entering the slots $h^{11}$, $h^{12}$, and $h^{13}$ in the hanger and driven into the frame B, holding the hanger to the frame in such manner as to prevent movement of the former or its shaft in any direction except that desired to permit the lower feed-roll $h$ to be moved vertically from and toward the upper feed-roll $g$ in the adjustment thereof to enable them to feed the material properly.

The connecting-rod $i$ is attached at one end to a collar $i'$, secured to the forward bearing $h^5$ of the shaft $h'$, and at its other end is pivoted to the rear end of the lever $i^2$, which at its forward end carries the step or socket $i^3$, pivoted thereto, and which receives the lower end of the shaft F, carrying the lower pouncing-tool. The connecting-rod $m$ is pivoted to the lever $i^2$ between its ends and near its rear end, and is in turn pivoted to the rear end of the treadle $m'$, which is fulcrumed in the bracket $m^2$, attached in the present instance to the base A. By this construction it will be noted that upon the operator bearing down upon the forward or free end of the treadle m' the rear end of the lever i², through the connecting-rod m, is raised to lift, through the connecting-rod i, the lower feed-roll toward the upper feed-roll to bring them in proper position relatively to feed the material to be placed between them toward the operating-tools. In such action the lever i² has a pivotal movement on the pivot i⁵, which connects the step or socket i⁸ to said lever, the socket in such instance bearing against the lower end of the shaft F. By further pressure on the treadle, and because of the engagement of the lower feed-roll with the upper feed-roll, or with the material placed between them, acting as a stop to prevent the further upward movement of the rear end of the lever i², the forward end of said lever is raised or lifted pivotally on the pivot i¹⁰, which joins the connecting-rod i with said lever, whereby the shaft F is lifted to bring the lower operating-tool in juxtaposition with the upper tool, so that both tools (one rotating in a direction opposite to that of the other, and one acting as a support for the material to the other) will pounce both sides simultaneously of the hat-brim or material fed between them by the feed-rolls. In such construction, employing two operating-tools rotating in opposite directions and one acting as a support for the material to the other, double work is performed, while one tool coacts with the other to maintain the material between them, except as fed along by the feed-rolls under the guidance of the operator. It is apparent, however, that it is clearly within the scope and spirit of my invention to employ one rotating tool without giving rotation to the other, so that the latter simply acts as a support, or a support may be provided in lieu of such latter tool.

I have found by experience that the employment of a pouncing or operating tool of two or two and a half inches face or diameter is productive of very satisfactory results in the rapidity of treatment without the usual attendant loss or damage of material and in the production of a fine velvety surface.

So far as I am aware, the pouncing-tools heretofore employed have been so constructed and arranged that they were designed and caused to bear against the material at one side of their center or axis of rotation, whereas the peculiarity of my invention is in the employment of a comparatively small rotating pouncing-tool, which bears on the material to be treated at or near the axis of rotation of said tool and at all sides of said axis of rotation at the same time.

I am aware that it is not new to employ in hat-pouncing machines a clutch or clamp carrying a pouncing-stone and attached to a shaft mounted in suitable bearings, which shaft is rotated, to in turn rotate the pouncing-stone carried in the clutch, and to thereby pounce hat-body material, substantially as set forth in United States Patent to Ira Gill, No. 243,067, granted June 21, 1881, and I make no claim herein to such invention.

I am aware of the patent of J. C. Richardson, No. 93,836, dated August 17, 1869, and make no claim whatever to anything therein set forth.

What I claim is—

1. In a machine for pouncing hat-bodies and similar material, a pouncing-tool of a diameter less than the width of the surface to be treated, and to bear on the material to be pounced at the axis of rotation of said tool and at all sides of said axis at the same time, substantially as specified, a support for the material to be treated, mechanism to give rotation to said pouncing-tool, rolls to feed the material to be treated to said pouncing-tool to be acted on thereby, and mechanism to actuate said rolls, combined and arranged to operate substantially in the manner and for the purpose set forth.

2. In a machine for pouncing hat-bodies and similar material, a pouncing-tool of a diameter less than the width of the surface to be treated, and to bear on the material at the axis of rotation of said tool and at all sides of said axis at the same time, substantially as specified, a movable support for the material to be treated, mechanism, substantially as described, for moving the support with relation to said tool, rolls to feed the material to be treated to and between said support and pouncing-tool to be acted on by the latter, and mechanism to actuate said rolls, combined and arranged to operate substantially in the manner and for the purpose set forth.

3. The combination, with a support for the material to be treated, and feed-rolls, one roll adjustable with relation to the other to feed the material, as specified, and adjusting mechanism for said rolls, substantially as described, of a pouncing-disk of a diameter less than the width of the surface to be treated, and to bear on the material at the axis of rotation of said tool and at all sides of said axis at the same time, substantially as specified, and mechanism to give rotation to said pouncing-tool, substantially as and for the purpose described.

4. The combination, with a support for the material to be treated, and feed-rolls, one roll adjustable with relation to the other, of a pouncing-tool of comparatively small diameter and dimensions, to bear on the material to be treated at or near the axis of rotation of said tool and at all sides thereof at the same time, substantially as specified, and a lever with connected mechanism, substantially as described, to first move one feed-roll toward the other to enable the material to be fed to and between the pouncing-tool and material-support, and then move said support toward the operating-tool to enable said material to be treated, substantially as and for the purpose set forth.

5. A pouncing tool or disk, means to rotate the same, a support for the material to be pounced or treated movable toward and from the pouncing-tool, a pair of feed-rolls to feed the material to and between the pouncing-tool and said support, one roll movable toward and from the other, mechanism to rotate said rolls, a lever having connection at one end with the adjustable roll and at its other end with the movable support, and a lever-operating mechanism attached to said lever between its ends, whereby one feed-roll is first moved toward its mate to enable the material to be fed to and between the pouncing-tool and support, and then the support is moved toward the pouncing-tool to enable said material to be treated, substantially as and for the purpose set forth.

6. The combination, with feed-rolls to feed the material to be treated and mechanism to actuate said rolls, of a pair of pouncing tools or disks, each of a diameter less than the width of the surface to be treated, and to bear on the material to be treated at the axis of rotation of said tool and at all sides of said axis at the same time, substantially as specified, the said disks having their pouncing-surfaces opposite each other and adjusted to rotate in opposite directions, and mechanism to rotate said tools, substantially as and for the purpose set forth.

7. The combination, with feed-rolls to feed the material to be treated, of a pair of pouncing tools or disks with their pouncing-surfaces opposite each other and secured one each to the adjacent ends of two spindles or shafts mounted in bearings in the same vertical plane, the upper shaft carrying the upper tool being loose in its bearings to have free vertical play, and weighted, as specified, and means to impart rotary movement to said shafts in opposite directions, substantially as specified.

8. In a machine for pouncing hat-bodies and similar material, a rotary pouncing tool or disk whose active surface is substantially coextensive with that portion of the material being immediately acted upon, and which bears on the material at its axis of rotation and at all sides of said axis at the same time, a support for the material to be treated, and feed-rolls to feed the material to said pouncing-tool to be acted on thereby, in combination, as and for the purpose specified.

In testimony whereof I have signed my name to this specification in the presence of two subscribing witnesses.

CHARLES W. STEVENS.

Witnesses:
ROBERT BROWN,
WM. A. KAUFFELT.